United States Patent [19]

Show

[11] Patent Number: 4,966,329
[45] Date of Patent: Oct. 30, 1990

[54] PREDATOR MITE AND BENEFICIAL INSECT FIELD APPLICATOR

[75] Inventor: Edgar D. Show, Watsonville, Calif.

[73] Assignee: Driscoll Strawberry Associates, Inc., Watsonville, Calif.

[21] Appl. No.: 337,597

[22] Filed: Apr. 13, 1989

[51] Int. Cl.⁵ ............... A01C 1/00; B65B 37/00
[52] U.S. Cl. .................... 239/650; 239/144; 239/590; 366/228; 138/42
[58] Field of Search .......... 366/57, 228, 606; 222/229, 210, 211, 547, 564; 239/650, 71, 144; 138/42, 37

[56] References Cited

U.S. PATENT DOCUMENTS

| | | |
|---|---|---|
| 198,210 | 12/1877 | Petingale . |
| 336,344 | 2/1886 | Perry . |
| 483,258 | 9/1892 | Meyer . |
| 519,387 | 5/1894 | Michael ............... 222/229 |
| 875,683 | 1/1908 | Bell . |
| 1,163,888 | 12/1915 | Bye . |
| 1,573,340 | 2/1924 | Weitman ............... 366/228 |
| 1,595,040 | 7/1926 | Voss . |
| 1,679,561 | 8/1928 | Cantrell ............... 239/71 |
| 1,802,058 | 4/1931 | Maciejski ............... 239/650 |
| 1,820,817 | 8/1931 | McRae ............... 222/564 |
| 2,086,404 | 7/1937 | Daniels . |
| 2,178,500 | 10/1939 | Singer . |
| 2,962,194 | 11/1960 | Cotter ............... 239/650 |
| 3,853,246 | 12/1974 | Dubois ............... 222/168 |
| 4,569,597 | 2/1986 | Louer et al. ............... 366/228 |
| 4,776,493 | 10/1988 | Tegel ............... 222/547 |

*Primary Examiner*—Andres Kashnikow
*Assistant Examiner*—Kevin P. Weldon
*Attorney, Agent, or Firm*—Townsend and Townsend

[57] ABSTRACT

An applicator (2) and method for distributing a formulation of predator mites and a carrier. The applicator consists of a container (4) having an opening (14) formed at one or both ends (8) thereof. A hollow neck (10) extends from the opening, away from the container. A dispensing port (16) is formed in the neck (10), is concentrically aligned with the opening. A baffle system (6) regulates the flow of the carrier and predator mite mixture as the applicator is rotated during dispensing of the mixture. The baffle system includes a first internal baffle (18) positioned at the end (8) of the container adjacent the opening. A second, exit baffle (20) is positioned within the neck adjacent the dispensing port. In application, the container is rotated about its longitudinal axis (28). Agitation paddles (12) are affixed to the inner surface (22) of the container for agitating the mixture to maintain a uniform consistency.

39 Claims, 4 Drawing Sheets

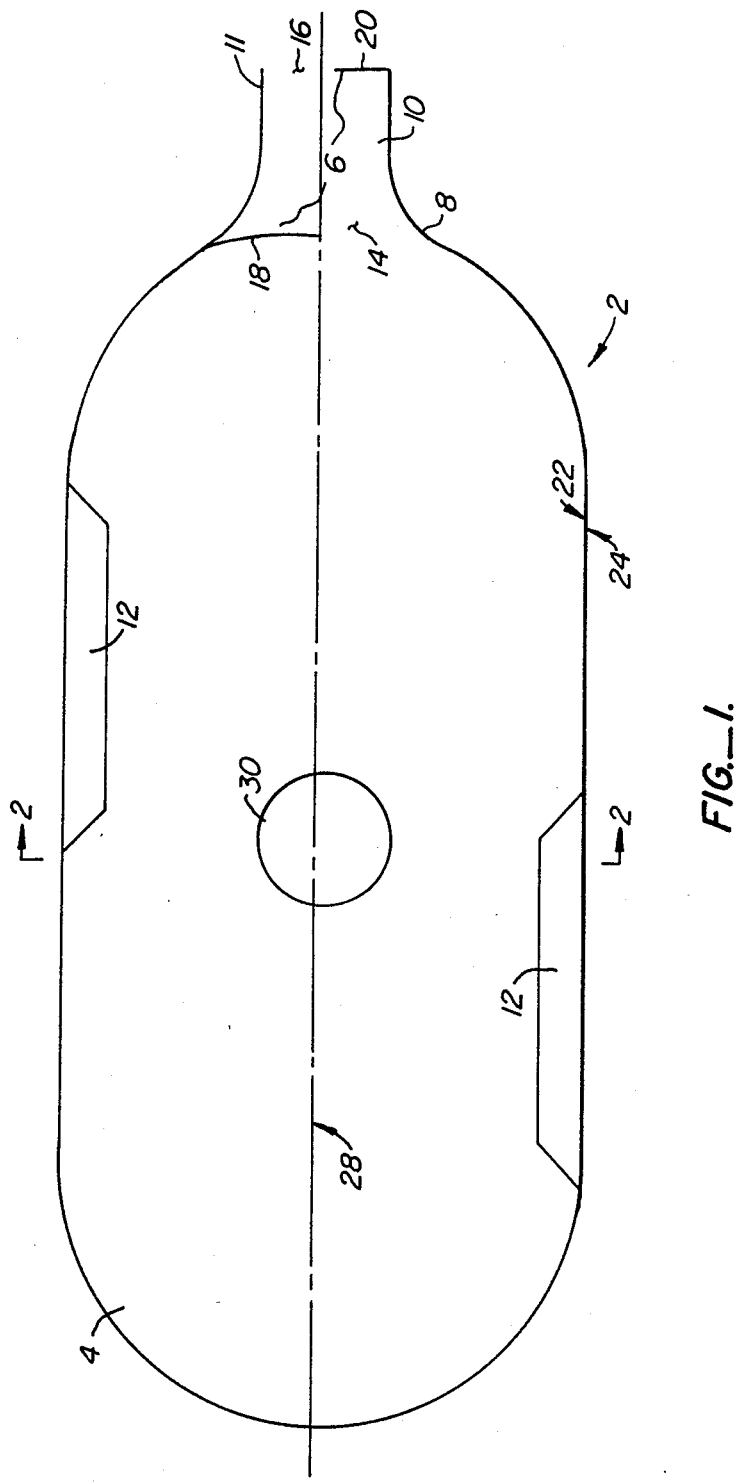
FIG._1.

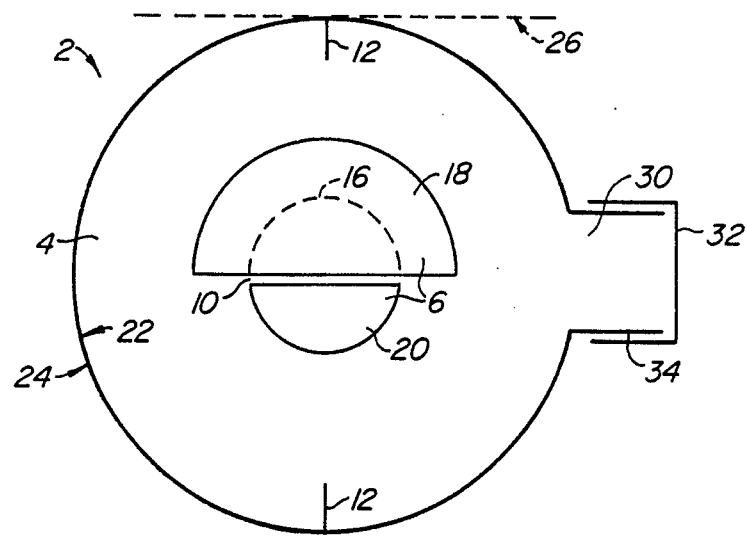
FIG._2.
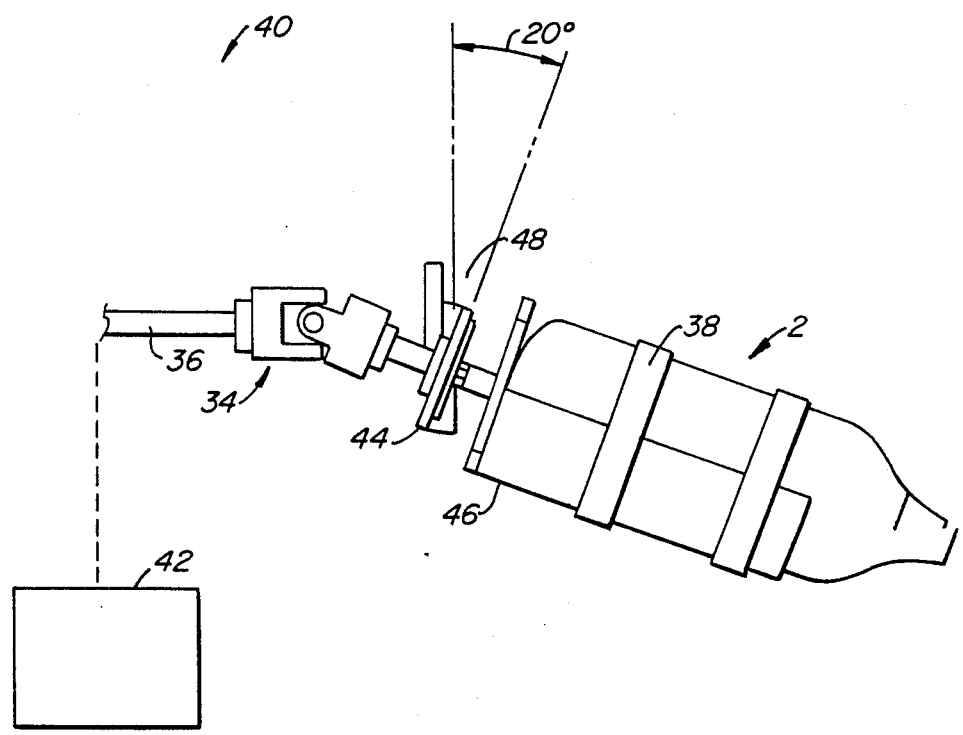
FIG._4.

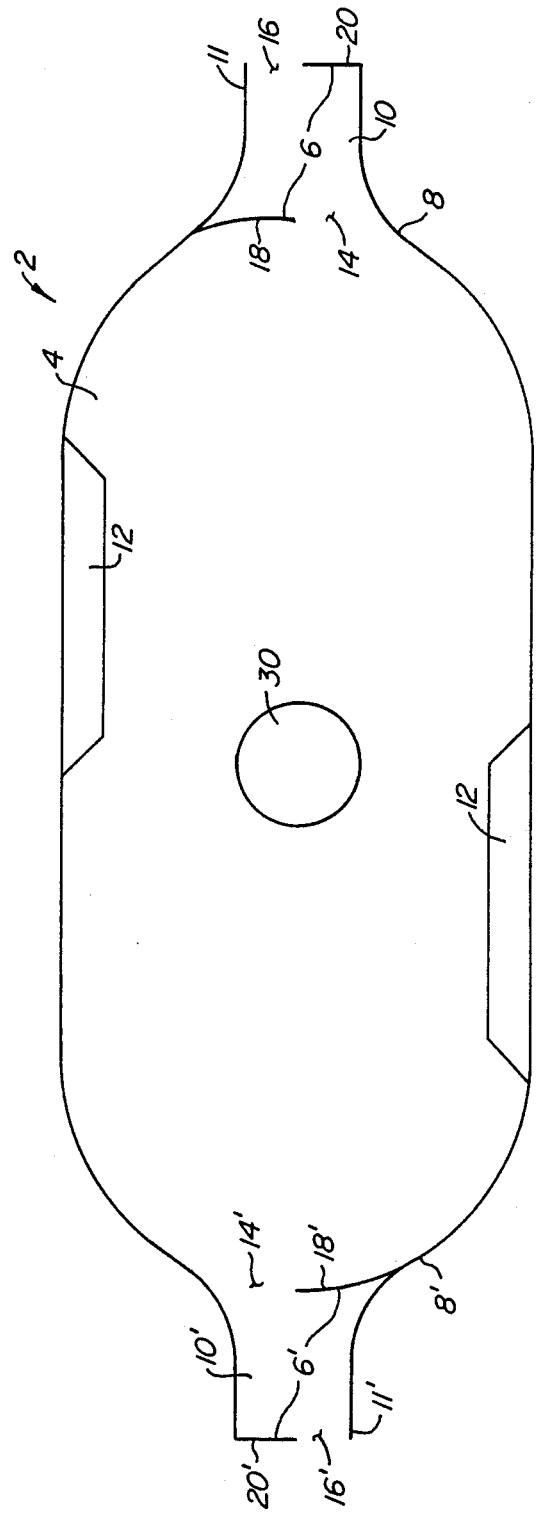
FIG._3.

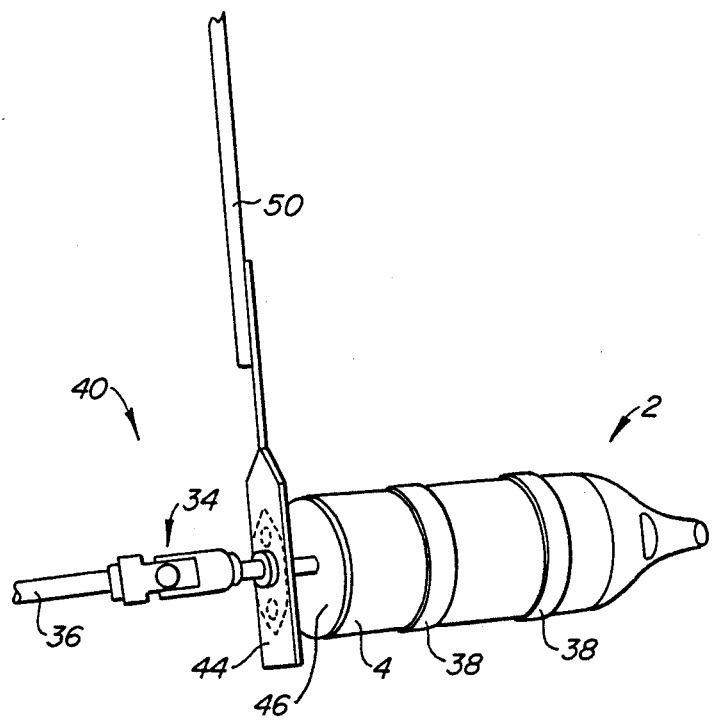
FIG._5.
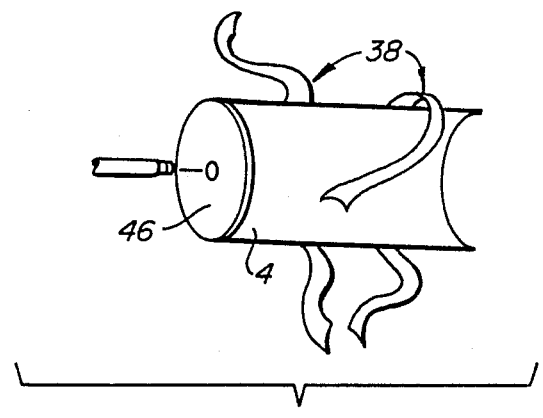
FIG._6.

PREDATOR MITE AND BENEFICIAL INSECT FIELD APPLICATOR

BACKGROUND OF THE INVENTION

Two-spotted spider mites often attack strawberry fields. Such plant-feeding pest mites are becoming increasingly resistant to currently available miticides. Rather than applying miticides to the plants, one method of controlling pest mites is to distribute a beneficial predatory mite which can be purchased in large quantities for release in the fields. The predator mites are combined and pre-packaged within a particulate material, such as vermiculite, sterile bran, or corn cob grits. The particulate serves to keep the mites separated from each other during transport and as a carrier when the mites are distributed in the field.

At the present time, there are two common methods of distributing predator mites formulated in a carrier. The first method is simply to remove the cap from the container in which the predator mites are shipped and walked down a row of plants, pouring the container s contents of predator mite and particulate, as evenly as possible, down the plant rows. Each individual shipment container typically holds about 250 milliliters of carrier and 1,000-2,000 predator mites. The second method of distributing predator mites consists of transferring the contents of 3-5 small predator mite shipping containers into a larger container, such as a 1-gallon mayonnaise jar with perforations in the screw on cap. The larger container is inverted and the predator mites and carrier are shaken onto the plants as though through a giant salt shaker.

In each of the prior art methods for distributing predator mites, there is a tendency of the predator mites to congregate at the highest point in the container. This results in an uneven predator-to-carrier ratio dispersement. Consequently, conventional methods may not afford optimal pest control. Additionally, prior art containers are generally constructed of an opaque white plastic material, making it difficult to discern the disposition of the contents. During application, prior art methods may not afford an efficient method of distribution for the predator mites onto the infested plants.

SUMMARY OF THE INVENTION

The present invention is directed to an applicator and method for distributing a mixture of phytosied mites formulated within a carrier.

The applicator of the preferred embodiment includes an elongated container having an opening at one end. A neck extends from the opening outwardly, away from the container, to a dispensing port in communication with the opening. A system of carrier flow restrictors, preferably in the form of baffles, incrementally regulates the carrier and predator mixture during the application process. A first, internal baffle is disposed adjacent the opening between the container and the neck. A second, exit baffle is disposed within the neck proximate the dispensing port. The first and second baffles preferably each have a semi-circular configuration and obstruct the opening and dispensing port, respectively. The internal baffle and exit baffle are oriented approximately 180° from each other such that the predator mite and carrier mixture must flow through the baffle system as the mixture is dispensed from within the container to the plant beds infested by pest mites. The opening and dispensing port are spaced apart and are preferably concentrically aligned. The internal and exit baffles are offset with respect to each other such that each baffle obstructs approximately one-half of the area of the respective opening or dispensing port in which the baffle is situated. The obstructed areas of the opening and the dispensing port preferably do not overlap but may overlap along the edges of the baffles.

A paddle is affixed to the inner surface of the container for agitating the mixture of predator mite and particulate material. The paddle preferably includes a generally flat surface extending perpendicularly to a tangent of the outer surface of the container.

Two fixed agitation paddles are present in the preferred embodiment. They are offset with respect to each other along a longitudinal axis of the container.

In an alternate embodiment, the applicator may include a dispensing port and opening at each of its ends. In this embodiment, the carrier and predator mite mixture is dispensed alternately from each end of the applicator so as to further overcome any tendency of the predator mites to congregate at the highest point in the container.

In a third embodiment, the applicator may be mounted to a vehicle drawn implement in order to automate the application process. A plurality of applicators may be attached to a multi-bed tractor so as to dispense the predator mite and carrier mixture simultaneously throughout a number of plant beds.

The container may be constructed of a transparent plastic material so as to easily monitor the disposition of the contents within the container.

Other features and advantages of the invention will appear from the following description in which the preferred embodiment has been set forth in detail in conjunction with the accompanying drawings.

BRIEF DESCRIPTION OF THE DRAWINGS

FIG. 1 is a cross-sectional view of the applicator.

FIG. 2 is a view taken along line 2—2 of FIG. 1.

FIG. 3 is an alternate embodiment of the present invention.

FIG. 4 is a rear view of a third alternate embodiment of the present invention.

FIG. 5 is a top view of the embodiment of FIG. 4.

FIG. 6 is an exploded view of the rear portion of the container as seen in FIG. 5.

DETAILED DESCRIPTION OF THE PREFERRED EMBODIMENTS

A predator mite applicator 2 incorporating the features of the present invention is illustrated in FIGS. 1-4. Applicator 2 includes a container 4 having a neck 10 disposed at an end 8 of container 4. A baffle system 6, through which a mixture formulated of predator mites, or other agricultural beneficials, and a carrier is dispensed, is disposed within neck 10. Agitation paddles 12 are affixed to the interior of container 4.

Container 4 has an elongated configuration and a circular cross-section. Neck 10 has a substantially cylindrical configuration extending outwardly from container 4 to a terminal end 11 of neck 10. Neck 10 is tapered from container 4 to terminal end 11. An opening 14 is formed at container end 8 between container 4 and neck 10. A dispensing port 16 is formed in neck 10 at its terminal end 11, spaced from opening 14. Opening 14 and dispensing port 16 are concentrically aligned with each other at opposite ends 8, 11 of neck 10. Opening 14 and dispensing port 16 communicate with each other through neck 10.

Baffle system 6 includes a first flow restrictor constituting an internal baffle 18 and a second flow restrictor constituting an exit baffle 20. Internal baffle 18 is positioned at container end 8 adjacent opening 14. Exit baffle 20 is positioned within neck 10 at terminal end 11 proximate dispensing port 16. Internal baffle 18 and exit baffle 20 each have a semi-circular cross-sectional configuration, as seen most clearly in FIG. 2. Internal baffle 18 and exit baffle 20 obstruct approximately one half of the area of opening 14 and dispensing port 16. respectively, The baffles are misaligned such that they are oriented approximately 180° from each other. Thus, internal baffle 18 is substantially aligned with the unobstructed portion of dispensing port 16. Similarly, exit baffle 20 is substantially aligned with the unobstructed portion of opening 14.

Agitation paddles 12 are affixed to an inner surface 22 of container 4 for agitating the mixture of predator mites and carrier. The configuration of each paddle 12 is a generally flat surface having a trapezoidal shape. Paddles 12 are disposed substantially perpendicular to a tangent 26 of outer surface 24 of container 4. Two agitation paddles 12, as seen in FIG. 1, are offset from each other along a longitudinal axis 28 of container 4.

A filling port 30 is disposed on outer surface 24 of container 4 for filling the container with the mixture of predator mite and carrier. Extension 34 projects perpendicularly away from outer surface 24 toward the exterior of container 4. Extension 34 is oriented such that it is also perpendicular to the outward direction of extension of neck 10. A cap 32 is disposed on an extension 34 for sealing the contents of container 4.

Container 4 is constructed of a transparent plastic material. This allows viewing of the disposition of the contents within container 4.

In use, container 4 is filled with a mixture of predator mites and carrier shortly before application of the mixture throughout a row of plant beds. Cap 32 is removed from extension 34 so that the pre-blended mixture is introduced into container 4 through filling port 30. Applicator 2, as seen in FIG. 1, is hand held for dispensing. Container 4 is rotated about longitudinal axis 28 during use. Rotation of container 4 promotes uniform mixing of the predator mites and carrier. As the container is rotated, the mixture converges on paddles 12, agitating the predator mite and carrier mixture, and overcoming a tendency of the mixture to slide along inner surface 22 of container 4.

During dispensing of the predator mite and carrier mixture, applicator 2 is held in the dispensing position, preferably at an angle of approximately 70° to the vertical. (See FIG. 4.) The mixture is dispensed through baffle system 6 for incrementally regulating the predator mite and carrier flow as applicator 2 is rotated during the application process. Gravity carries the predator mite and carrier mixture outwardly toward end 8, into neck 10, and through terminal end 11 for application. Internal baffle 18 prevents pouring of the mixture through end 8, but rather maintains the blended character of the predator mite and carrier mixture. Similarly, the mixture bears upon exit baffle 20, moving through dispensing port 16 for dispensing onto the plant beds.

As application of the mixture within container 4 progresses, the disposition of the contents may be viewed through the transparent plastic material of which container 4 is constructed.

Applicator 2', as seen in FIG. 3, illustrates an alternate embodiment having dual dispensing ports 16, 16'. In this embodiment, a neck 10 is disposed at each end 8, 8' of container 4 including a dual baffle system 6. One baffle system 6, 6' is positioned within each of openings 14, 14' and dispensing ports 16, 16'. Filling port 30 is located equidistant from openings 14, 14' of container 4. Applicator 2' is not only rotated about its longitudinal axis but is rocked back and forth to alternatively direct its ends 8, 8' downwardly so that the mixture is dispensed from each end. This further helps to reduce the tendency of the mites to congregate.

The embodiment of FIG. 3 has an operation similar to the embodiment of FIG. 1. As discussed above, FIG. 3 differs from FIG. 1 in that FIG. 3 has dual dispensing ports 16, 16' for dispensing the predator mite and carrier mixture through alternate ends 8, 8' of container 4. In addition to rotating container 4 about longitudinal axis 28, the embodiment of FIG. 3 is also rocked end 8 to end 8'. This provides an additional means for preventing the predator mites to congregate at the highest point in the container, which would result in an uneven predator mite-to-carrier ration disbursement.

FIGS. 4-6 illustrate the use of applicator 2 in an automated manner. Applicator 2 is mounted to a vehicle drawn implement 40. U-joint 34 is connected to a shaft 36 mounted to a wheel 42, shown in schematic in FIG. 4. Container 4 is mounted to a plate 44 via a bracket 46. Velcro straps 38 are used to retain applicator 2 within bracket 46, as seen in FIG. 6. Plate 44 is disposed at an angle 48 of approximately 20° to the vertical for optimal dispensing of the predator mite and carrier mixture. Thus, applicator 2 is optimally held at an angle of approximately 70° to the vertical. FIG. 5 illustrates applicator 2 held within bracket 46 of implement 40. Connector 50 extends to an additional bracket 46, plate 44 and U-joint 34 for holding a number of applicators 2 spaced apart approximately the same distance as adjacent rows of plant beds. In this way, a plurality of applicators 2 is mounted to implement 40 for dispensing the predator mite and carrier mixture simultaneously among a number of plant beds.

The embodiment of FIG. 4 has an operation similar to the operation of the embodiment of FIG. 1. As discussed above, FIG. 4 discloses an automated applicator 2 attached to a vehicle, such as by a tractor drawn implement. The embodiment of FIG. 4 employs the embodiment of FIG. 1 and differs only in that the embodiment shown in FIG. 4 is attached to plate 44 of the tractor drawn implement 40. A plurality of applicators 2 is mounted to implement 40 for simultaneously dispensing the predator mite and carrier mixture among a plurality of adjacent plant beds.

Modification and variation may be made to the preferred embodiments without departing from the subject of the invention as defined in the following claims. For example, beneficials other than predator mites, such as beneficial wasps, lacewing eggs, or other predators, can be dispensed with the invention. Baffles 18, 20 may be configured differently, increased or decreased in number or positioned differently. Although rotation about axis 28 is preferred, rotation could be about a line at an acute angle to axis 28 if desired.

In the preferred embodiment, it is within the scope of this invention to achieve agitation by other methods. For example, the internal configuration of container 4 could provide for agitation by rocking the container; including a rectangular configuration having corners which churn the mixture: providing a rough inner surface 22 of container 4 or by baffle system 6.

What is claimed is:

1. An applicator for distributing a mixture of particulate material, the applicator comprising:
   a container having first and second ends and an opening formed at the first end of said container;
   a neck disposed at said first end of said container and extending outwardly therefrom, said neck including a dispensing port in communication with said opening;
   a first flow restrictor disposed towards said opening; and
   a second flow restrictor disposed within said neck towards said dispensing port;
   wherein said opening and said dispensing port are concentrically aligned and wherein said first and second flow restrictors are misaligned.

2. The applicator as defined by claim 1 wherein said first flow restrictor obstructs approximately one half of the area of said opening and wherein said second flow restrictor obstructs approximately one half of the area of said dispensing port.

3. The applicator as defined by claim 2 wherein said first and second carrier flow restrictors are oriented approximately 180° from each other.

4. The applicator as defined by claim 1 wherein said first and second flow restrictors each have a semicircular configuration.

5. The applicator as defined by claim 1 wherein said first flow restrictor comprises an internal baffle and wherein said second flow restrictor comprises an exit baffle.

6. The applicator as defined by claim 1 further comprising means affixed to the inner surface of said container for agitating the mixture of particulate material.

7. The applicator as defined by claim 1 further comprising an agitation paddle disposed on the interior of said container.

8. The applicator as defined by claim 7 wherein said agitation paddle is affixed to the inner surface of said container.

9. The applicator as defined by claim 7 wherein said agitation paddle comprises a generally flat surface disposed substantially perpendicularly to a tangent of the outer surface of said container.

10. The applicator as defined by claim 7 comprising a plurality of agitation paddles.

11. The applicator as defined by claim 10 wherein said first and second ends of said container are positioned along a longitudinal axis and wherein said agitation paddles are offset from each other along said longitudinal axis.

12. The applicator as defined by claim 1 wherein said container includes a dispensing port positioned at said first and second ends.

13. The applicator as defined by claim 1 further comprising means for dispensingly mounting said applicator to a vehicle.

14. The applicator as defined by claim 13 further comprising means for dispensingly mounting a plurality of applicators to said vehicle.

15. The applicator as defined by claim 1 further comprising means for holding and dispensing said applicator.

16. The applicator as defined by claim 15 wherein said means for holding and dispensing includes a bracket attached to an implement.

17. The applicator as defined by claim 15 further comprising straps for retaining said applicator on said means for holding and dispensing.

18. The applicator as defined by claim 1 wherein the container is constructed of a transparent plastic material.

19. The applicator as defined by claim 1 further comprising a filling port oriented perpendicular to said opening and said dispensing port.

20. The applicator as defined by claim 1 wherein said container comprises a circular cross-section.

21. An applicator for distributing a mixture of particulate material, the applicator comprising:
   a container having a first and second end and an opening formed at said first end:
   a neck disposed at said opening and extending outwardly therefrom, said neck including a dispensing port concentrically aligned with said opening and being in communication therewith, said dispensing port positioned outwardly of said container;
   a substantially imperforate internal baffle disposed towards said opening between said container and said neck, said internal baffle obstructing a substantially continuous portion, approximately one half of the area of said opening;
   a substantially imperforate exit baffle disposed within said neck towards said dispensing port and obstructing a substantially continuous portion, approximately one half of the area of said dispensing port;
   said internal baffle and said exit baffle being oriented approximately 180° from each other such that said internal and exit baffle are offset from each other; and
   a paddle disposed on the inner surface of said container for agitating the mixture of particulate material.

22. The applicator as defined by claim 21 wherein said internal baffle and said exit baffle each include a semicircular configuration.

23. The applicator as defined by claim 21 wherein said paddle is disposed substantially perpendicular to a tangent of the outer surface of said container.

24. The applicator as defined by claim 21 wherein said container is constructed of a transparent material.

25. The applicator as defined by claim 21 wherein said opening is formed at each of said first and second ends of said container.

26. The applicator as defined by claim 25 further comprising a filling port disposed on said container equidistant from the openings of said container.

27. The applicator as defined by claim 1 further comprising means for rotating said container, thereby agitating the mixture of particulate material.

28. The applicator as defined by claim 1 wherein said internal baffle and said exit baffle comprise means for regulatingly dispensing the flow of mixture through said neck.

29. The applicator as defined by claim 1 wherein the first flow restrictor is adjacent said opening and said second flow restrictor is proximate said dispensing port.

30. A method for dispensing a mixture of agricultural beneficials formulated within a carrier comprising:
   filling a container, the container having a first end and a second end and an outwardly extending neck positioned at the first end, with a mixture of the beneficials and carrier, the container including an internal agitating member and a longitudinal axis passing through the first end;

rotating said container, thereby agitating the mixture of beneficials and carrier; and regulatingly dispensing of the flow of the mixture through the first end and neck of the container by passing the mixture through a system of carrier flow restrictors disposed within a region defined generally between an opening in said first end of said container and a dispensing port in said neck.

31. The method as defined by claim 30 wherein the step of rotating said container includes rotating said container axially along a longitudinal axis of said container.

32. The method as defined by claim 30 wherein agitating the mixture of beneficials and carrier is carried out by passing the mixture against agitation paddles affixed to the inner walls of the container.

33. The method as defined by claim 30 wherein the step of regulating dispensing includes passing the mixture past an internal baffle positioned adjacent the opening and past an exit baffle positioned adjacent said dispensing port.

34. The method as defined by claim 30 wherein said step of rotating includes maintaining said container at a fixed angle with respect to the horizontal and rotating said container about said longitudinal axis.

35. The method as defined by claim 30 further comprising the step of dispensing the mixture simultaneously among a plurality of plant beds.

36. The method as defined by claim 30 further comprising the step of mounting said container to a vehicle.

37. The method as defined by claim 30 further comprising the step of viewing the contents of said container through a container constructed of a transparent material.

38. The method as defined by claim 30 further comprising the step of rocking the container from end to end.

39. The method as defined by claim 38 wherein the step of regulatingly dispensing comprises dispensing through openings formed in both said first and second ends of said container.

* * * * *